May 23, 1933.  J. W. LEIGHTON  1,910,256
SPRING SHACKLE FOR MOTOR VEHICLES
Filed Oct. 13, 1932
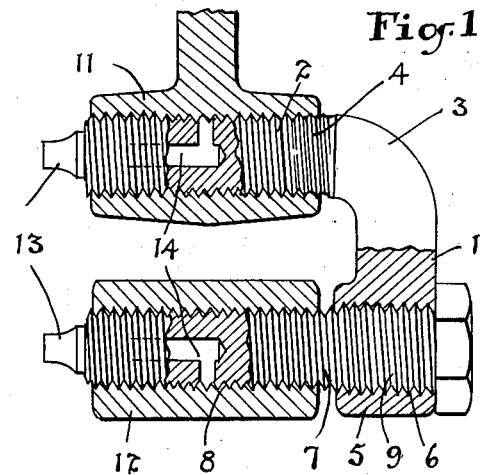
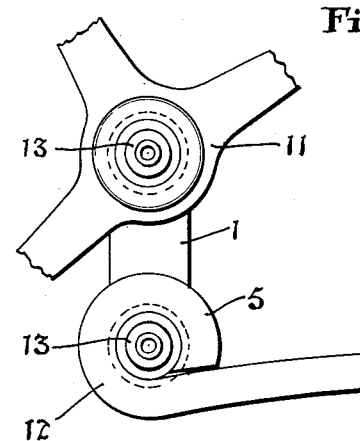
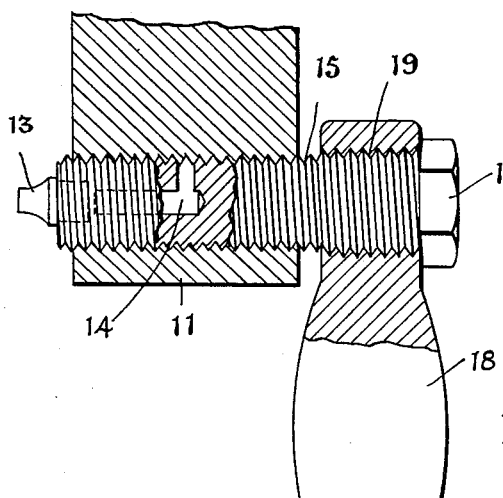
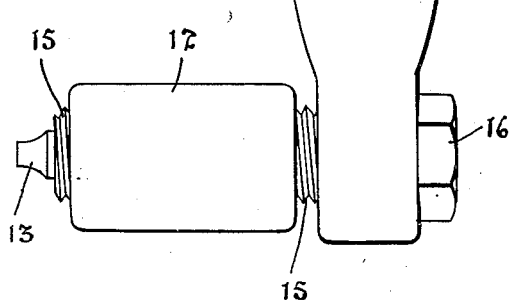
Inventor.
John Wycliffe Leighton.
by H. J. S. Dennison
atty Patented May 23, 1933

1,910,256

UNITED STATES PATENT OFFICE

JOHN WYCLIFFE LEIGHTON, OF PORT HURON, MICHIGAN

SPRING SHACKLE FOR MOTOR VEHICLES

Application filed October 13, 1932. Serial No. 637,575.

The principal objects of the invention are, to produce a shackle for connecting the vehicle frame with the spring end which will be capable of easy alignment with both frame and spring bearings and which may be easily and quickly assembled.

A further and important object is to provide a self-aligning form of shackle which will eliminate side play in the shackle, will overcome many of the difficulties experienced with the maintenance of shackle connections and will provide a shackle which will enable the elimination of bushings for the bearing parts, if desired.

The principal feature of the invention consists in the novel construction of a shackle whereby a pair of threaded members arranged substantially parallel to engage in bearing contact with threaded orifices in the members connected thereby are rigidly connected together each with one end free.

In the drawing, Figure 1 is an elevational and part sectional view of one form of my improved shackle.

Figure 2 is a side elevational view of the structure shown in Figure 1.

Figure 3 is an elevational part sectional view of a modified form of the invention.

Figure 4 is a side elevational view of the structure illustrated in Figure 3.

In the form of the invention illustrated in Figures 1 and 2 the shackle is formed of an L-shaped member 1, the short end 2 of which is threaded inwardly from its extremity to a point adjacent to the angle bend 3, the bottom of the thread 4 being flared outwardly to merge with the outer diameter.

The end of the long member 1 is preferably upset to form an enlarged and substantially circular portion 5 and a threaded orifice 6 extends through the circular portion having its axis substantially parallel to the axis of the threaded short end 2.

A bolt 7 is threaded over the major portion of its length with a thread 8 of the same pitch as the thread of the short end 2 of the shackle 1 and of substantially the same diameter as the portion 2 for the major portion of its length, the portion 9 of the threaded shank of the bolt 7 adjacent to the head being preferably formed of a slightly larger diameter.

The portion 9 extends for substantially the thickness of the end portion 5 of the shackle member 1 and is adapted to engage the thread of the orifice 6 in a binding contact.

The threaded extensions 2 and 8 project preferably in right angular relation to the shackle member 1 and are substantially parallel with each other. These ends are threaded into the threaded frame bracket 11 and a spring eye 12 respectively.

The threads of the shackle engage the threads of the spring eye and frame bracket in a snugly rotating fit.

Suitable lubricating fittings 13 are arranged on the free ends of the threaded shackle members and ducts 14 conduct the lubricant to the threaded bearing surfaces.

In assembling this shackle the threaded end 2 of the L-shaped member 1 is first threaded into either the spring eye or frame bracket and when it has been adjusted to the desired position so that it will swing freely, the bolt 7 is inserted through the threaded orifice 6 in the other end of the shackle member and will thread therethrough, the portion 8 turning loosely in the larger thread 6 and the projecting end is threaded into the threaded bearing portion of the frame end or spring eye.

The bolt is turned to carry the threaded end through the spring eye or frame bracket and during the latter part of its travel the larger threaded portion 9 of the bolt engages the thread 6 in a tight fit so that when the head is finally jammed against the shackle member 1 the bolt 7 will be rigidly locked therein.

In the form of the invention shown in Figures 3 and 4 a pair of threaded bolt members 15 are provided, each having a head end 16. These bolts are adapted to be threaded into the threaded bearing orifices in the frame bracket and spring eyes, and the portion 17 of the threaded shank adjacent to the head is preferably of a slightly larger pitch diameter than that of the bearing portion.

The shackle member 18 is preferably formed with orifices 19 one adjacent to each end, the inner wall of which is threaded to engage the enlarged threaded portions 17 of the bolts 15 in a binding engagement which will insure the bolts being locked securely so that they will be rigid with the shackle.

The means of locking the inserted bolts described is extremely simple, but it must be understood that other means for locking the bolts in the shackle members may be used if desired.

It will be readily understood that the threaded bearing ends of the bolts 15 may be threaded through the shackle member directly into the threaded bearing surfaces of the frame bracket and spring eye, and as with the construction illustrated in Figures 1 and 2, bearing bushings may be dispensed with, as each of the threaded elements of the shackle may be screwed into place in their respective engaging members.

In each case the shackle consists of a bar rigidly connected with a pair of threaded members which are threaded into the frame bearing and spring bearing respectively and maintain a free swinging journal support spaced from the shackle bar and capable of being aligned in accordance with the alignment of the axes of both spring and frame members, that is to say, by reason of the ends of the threaded members of the shackle being unconnected the said threaded ends may be drawn out of their true parallel position to accommodate the shackle to any discrepancy in the alignment of the axes of the holes of the frame bracket and spring eye and this adjustment will occur without undue binding of the engaging journal surfaces, eliminating squeaks and seizures.

What I claim as my invention is:

1. In a spring shackle, the combination with a spring end and frame bracket, of a pair of threaded members each engaged in threaded bearing contact with said spring end or bracket, and a shackle member rigidly connected to one end of each of said threaded members and forming the sole connection therebetween leaving their other ends free.

2. In a spring shackle, the combination with a spring end and frame bracket, of a pair of threaded members engaging respectively said spring end and frame bracket in threaded journal contact, and having a rigid threaded connection with each other confined solely to one side of the spring and bracket.

3. In a spring shackle, the combination with a spring end and frame bracket each having a threaded bearing orifice, of a pair of separate members each threaded into one of said bearing orifices, and means rigidly securing one end of one of said separate members with one end of the other of said separate members and supporting said separate members rigidly in substantially parallel positions each with one end free.

4. In a spring shackle, the combination with a spring end and frame bracket each having a threaded bearing orifice, of a rigid shackle member having a right angular extension threaded to engage the threaded orifice of said bracket or spring end, and a threaded member adapted to be inserted separately into the other threaded bearing member, and means for rigidly securing said latter threaded member to the aforesaid shackle member with one end thereof free.

5. In a spring shackle, the combination with a spring end and frame bracket each having a threaded bearing orifice, of a rigid right angular-shaped member having one end threaded to engage in bearing contact with said bracket or spring end and having a threaded orifice in its other end, and a bolt threaded through said orifice and extending into and engaging in bearing contact with the threaded orifice of the other threaded bearing member.

6. A spring shackle comprising, a shackle bar having a threaded orifice extending transversely therethrough, and a threaded bearing bolt threaded through said orifice having a portion of its threaded surface adjacent to its head engaging the surface of the orifice in locking contact, said shackle bar representing the sole support for said bearing bolt.

7. A spring shackle comprising, a shackle bar having a threaded orifice extending transversely therethrough, and a bolt threaded through said orifice having a portion of its threaded surface adjacent to its head of the same pitch but of larger pitch diameter than the bearing portion and adapted to lock in the orifice of the shackle.

8. In a spring shackle, the combination with a spring end and frame bracket each having a threaded bearing orifice, of a rigid integral right angular-shaped member having one end threaded to engage in bearing contact with said bracket or spring end and having an orifice in its other end, and a threaded bolt engaging in bearing contact with the threaded orifice of the other threaded bearing member and supported solely from one end by rigid securement in the orifice of said right angular-shaped member.

JOHN WYCLIFFE LEIGHTON.